United States Patent Office 3,217,025
Patented Nov. 9, 1965

3,217,025
THIONOPHOSPHORIC ACID ESTER AND A PROCESS FOR THE PRODUCTION THEREOF
Gerhard Schrader, Wuppertal-Cronenberg, Germany, assignor to Farbenfabriken Bayer Aktiengesellschaft, Leverkusen, Germany, a corporation of Germany
No Drawing. Filed Feb. 4, 1964, Ser. No. 342,524
Claims priority, application Germany, Feb. 23, 1963,
F 39,097
1 Claim. (Cl. 260—461)

The present invention relates to and has as its object a new and useful, pesticidally, especially insecticidally active phosphorus-containing compound.

More specifically this invention is concerned with O,O-dimethyl-thionophosphoric acid-O-(3-nitrophenyl) ester of the formula

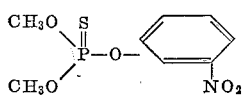

as well as with a process for the production of this compound.

The outstanding insecticidal activity of phosphoric or thionophosphoric acid-O-(4-nitrophenyl) esters has been already known for a longer time. In particular, the O,O-dimethyl- and the O,O-diethyl-O-(4-nitrophenyl)-thionophosphoric acid esters possess an excellent effect against a lot of insect pests. For this reason the two last-mentioned compounds have attained considerable industrial importance; they are commercially available as pest control agents or plant protectives with a broad spectrum of activity.

Furthermore, it is explicitly stated in the monography by G. Schrader, "Die Entwicklung neuer Insektizide auf Grundlage organischer Fluor- und Phosphorverbindungen" (2nd edition, Verlag Chemie, Weinheim/Bergstrasse, pages 55–56) that the 4-nitrophenyl radical is decisive for the outstanding insecticidal effectiveness of the said substances. If in the O,O-diethyl-thionophosphoric acid-O-(4-nitrophenyl) ester, the 4-nitrophenyl radical is replaced by the 2- or 3-nitrophenyl radical, products are formed which, although they hardly differ from the 4-isomer as to their external behaviour, are nevertheless substantially inferior with regard to their insecticidal properties. According to the data given by the above-mentioned author, the o-compound still possesses a noticeable activity, whereas the m-isomer is only very little effective. According to the statements made by Schrader, on the other hand, the O,O-dimethyl-thionophosphoric acid-O-(4-nitrophenyl) ester is distinguished from the corresponding diethyl compound merely by a lower toxicity towards warm-blooded animals, while having the same insecticidal effect. Therefore, it was to be expected on account of teachings regarding the relations between constitution and effect of the three isomeric O,O-diethyl-thionophosphoric acid-O-(nitrophenyl) esters, that analogous conditions would also prevail in the series of the corresponding O,O-dimethyl compounds, that is to say that, compared with the o- and p-isomers, the O,O-dimethyl-thionophosphoric acid-O-(3-nitrophenyl) ester would show the lowest insecticidal activity.

In accordance with the present invention it has now been found that, very surprisingly, the O,O-dimethyl-thionophosphoric acid-O-(3-nitrophenyl) ester which has not yet been described in the literature, is not only distinguished by outstanding insecticidal properties combined with an extremely low toxicity towards warm-blooded animals, but the product is clearly superior in this respect to the known o- and p-compounds.

This completely unexpected and technically valuable superiority of the product of the invention can be seen from the following table which gives the threshold values for the concentrations of active substance.

| Constitution | Application against— | Concentration active ingredient in percent | Killing rate of pests in percent |
|---|---|---|---|
| (CH₃O)₂P(S)—O—C₆H₄—NO₂ (meta) | Beetles | 0.004 | 60 |
| | Caterpillars | 0.0008 | 20 |
| | Larvae of flies | 0.001 | 90 |
| | Grain weevils | 0.01 | 100 |
| (CH₃O)₂P(S)—O—C₆H₄—NO₂ (ortho) | Beetles | 0.02 | 40 |
| | Caterpillars | 0.0008 | 0 |
| | Larvae of flies | 0.01 | 90 |
| | Grain weevils | 0.01 | 0 |

The various tests have been carried out in the manner as described in the following paragraphs:

Aqueous dilutions of the compounds have been prepared by mixing the active ingredients with the same amounts of dimethyl formamide as an auxiliary solvent adding thereto 20% by weight referred to active ingredient of a commercial emulsifier consisting of a benzyl hydroxy polyglycol ether containing about 10 to 15 glycol ethers, and diluting this premixture at last with water to the desired concentration as indicated above.

The tests have been carried out as follows:

(a) Against beetles: Dock leaves (*Rumex obtusifoliuse* and potato leaves (*Solanum tuberosum*) are sprayed drip wet with solutions prepared as indicated above and of concentrations as shown above. The leaves have been heavily infested with dock beetles (*Gastrophysa viridula*) and Colorado beetles (*Leptinotarsa decemlineata*) respectively. Evaluation has been carried out after 24 hours and 6 days.

(b) Against caterpillars of the type diamond black moth (*Plutella maculipennis*): White cabbage has been sprayed drip wet with aqueous emulsions as prepared above in a concentration as shown above. Caterpillars (10 each) have been placed on the sprayed leaves of the white cabbage. The living status has been determined after 24 and 48 hours.

(c) Again larvae of flies (*Musca domestica*). About 10 fly larvae are placed under covered Petri dishes in which drip wet filter papers have been placed which were sprayed with an insecticidal solution of a concentration as shown above and prepared as indicated above. Evaluation occurred after 10 days.

(d) Against grain weevils: About 20 pests were placed under covered Petri dishes in which drip wet filter paper has been placed. This filter paper is sprayed drip wet with an insecticidal solution prepared as indicated above and in a concentration as shown above. The living status of the grain weevils has been determined after 24 hours.

However, compared with the known isomers, the decisive advantage of the compound according to the invention, consists, in addition to its extremely low toxicity towards warm-blooded animals (mean toxicity [$DL_{50}$] on rats per os 500 mg. per kg. of animal weight), in the unexpected long-lasting effect against mosquitoes and flies, even when applied on limed substrates. Thus, the O,O-dimethyl-thionophosphoric acid-O - (3-nitrophenyl) ester still possesses its full effectiveness against *Musca domestica* and species of aedes after 16 weeks, whereas the corresponding o-compound and even the substantially more toxic p-isomer have completely lost the residual effect already after 3 weeks.

The production of the O,O-dimethyl-thionophosphoric acid-O-(3-nitrophenyl) ester is carried out by reacting 3-nitrophenol with O,O-dimethyl-thionophosphoric acid halides especially the corresponding chloride, preferably in the presence of acid-binding agents. Alkali metal carbonates or alcoholates and tertiary amines, e.g. dimethyl aniline, triethylamine or pyridine, have proved to be especially suitable as acid-binding agents.

Alternatively, it is also possible to produce first the salts, preferably the alkali metal or ammonium salts, of 3-nitrophenol in substance and subsequently to react these further according to the present invention.

Furthermore, the inventive process is preferably carried out in the presence of inert organic solvents. There may be used for this purpose lower aliphatic ketones or nitriles, such as acetone, methyl ethyl ketone, metyl isopropyl ketone and methyl isobutyl ketone as well as acetonitrile and propionitrile, and also dimethyl formamide.

It has also been proved expedient to carry out the reaction according to the invention at slightly to moderately elevated temperatures (30 to 80° C.) and, after combining the starting components, to continue stirring the mixture for some time (1 to 3 hours) while heating, in order to complete the reaction. The product of the process according to the invention is thus obtained in especially good yields and with an outstanding degree of purity.

The O,O-dimethyl-thionophosphoric acid-O-(3-nitrophenyl) ester obtainable according to the present invention is a colourless liquid which boils at 102° C. under a pressure of 0.01 mm. Hg.

On account of the outstanding insecticidal properties described above, the product is used as pest control agent, especially for plant protection.

The new compound of the present invention very effectively kills insects like aphids, spider mites, caterpillars, beetles, flies, ticks, etc. It distinguishes itself especially by a good contact-insecticidal activity and also by a systemic and ovicidal action. At the same time it has an activity on eating insects such as caterpillars. As already stated above most surprisingly it is of remarkably low toxicity against warm-blooded animals. It may be used in the same manner as other known phosphoric insecticides, i.e. in a concentration from about 0.00001% to about 1%, diluted or extended with suitable solid or liquid carriers or diluents. Examples of such solid carriers are talc, chalk, bentonite, clay and the like, as liquid carriers there may be mentioned water (if necessary with commercial emulsifiers), alcohols, especially lower alcohols such as methanol or ethanol, ketones, especially lower ketones such as acetone or methyl ethyl ketone, liquid hydrocarbons and the like. The new compound may furthermore be used in combination with known insecticides, fertilizers, etc.

The following example is given for the purpose of illustrating the invention as claimed in greater detail.

*Example*

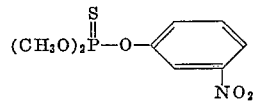

556 g. (4 mols) of 3-nitrophenol are dissolved in 2000 cc. of methyl ethyl ketone. 640 g. of finely sieved potassium carbonate are added to this solution which is then mixed dropwise with vigorous stirring at 50 to 60° C., within 1½ hours, with 642 g. of O,O-dimethyl-thionophosphoric acid chloride. When the exothermal reaction has subsided, the mixture is heated to 60 to 65° C. for a further 2 hours, then cooled to room temperature and poured into 4000 cc. of ice-water. The separated oil is taken up in 1000 cc. of benzene, the benzene solution washed twice with 30 cc.-portions of 1 N sodium hydroxide solution and finally dried over sodium sulphate. After distilling off the solvent in a vacuum, 840 g. of the O,O-dimethyl-O-(3 - nitrophenyl) - thionophosphoric acid ester are obtained, corresponding to a yield of 80% of the theoretical. The product boils at 102° C. under a pressure of 0.01 mm. Hg.

The mean toxicity ($DL_{50}$) of the compound on rats per os amounts to about 500 mg. per kg. of animal weight.

I claim:

O,O-dimethyl-thionophosphoric acid-O-(3-nitrophenyl) ester.

References Cited by the Examiner

FOREIGN PATENTS 793,758  4/58  Great Britain.
41  12/49  Philippines.

OTHER REFERENCES

Metcalf: "Organic Insecticides," Interscience Publishers, Inc., New York, New York (1955), page 292.

CHARLES B. PARKER, *Primary Examiner.*